Figure 5:
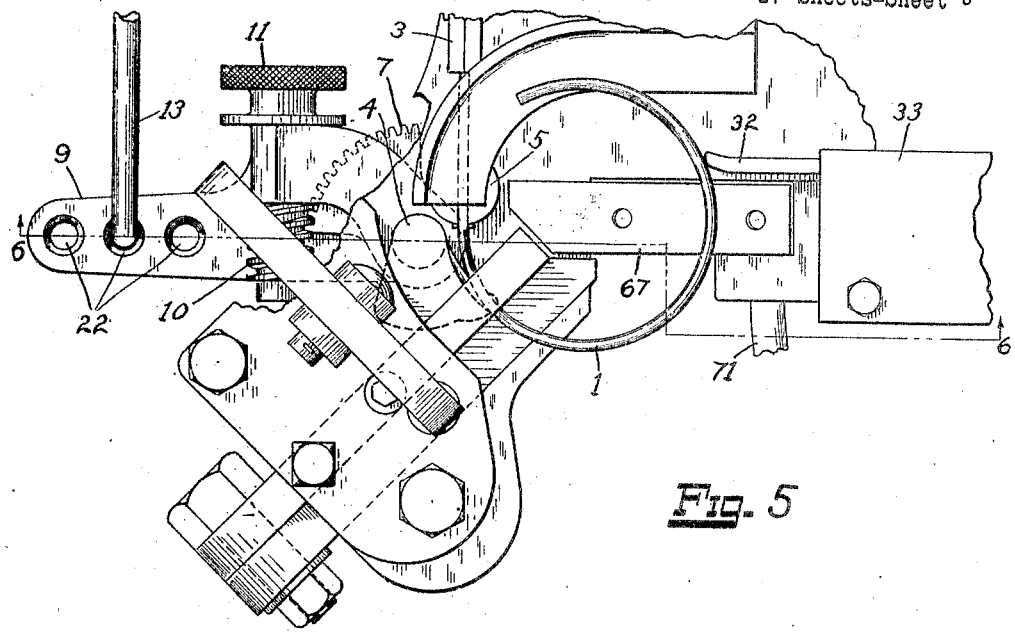

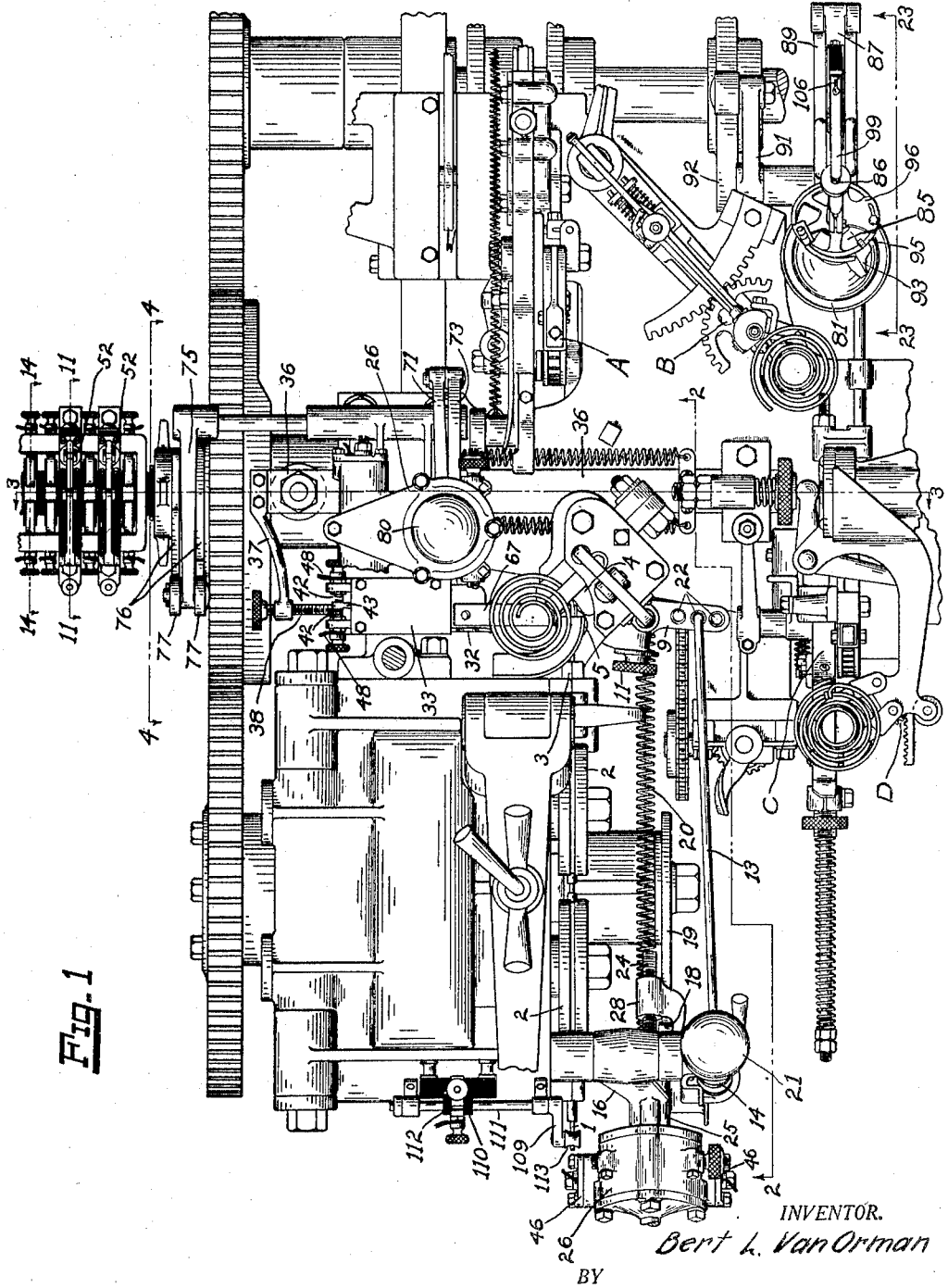

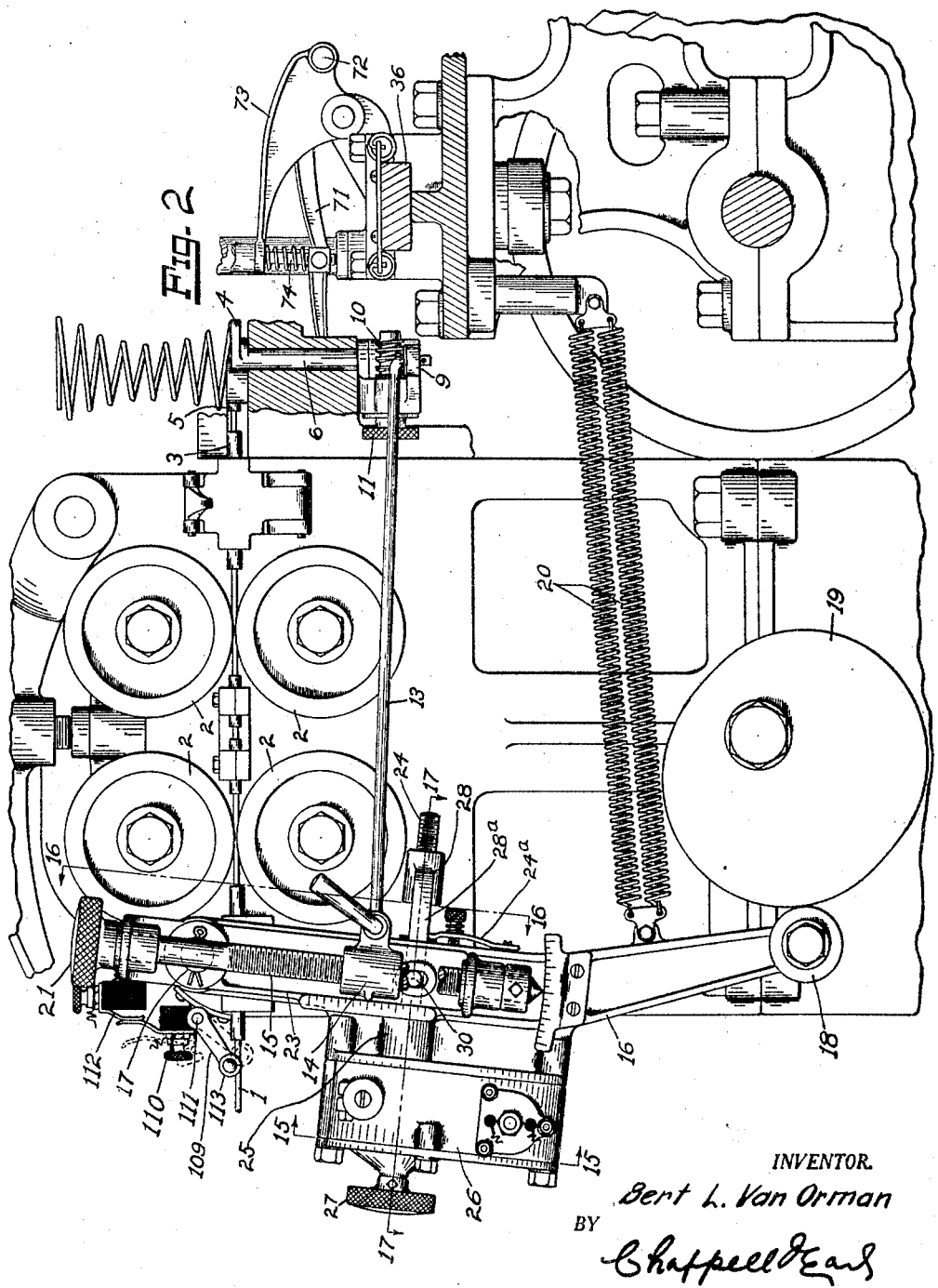

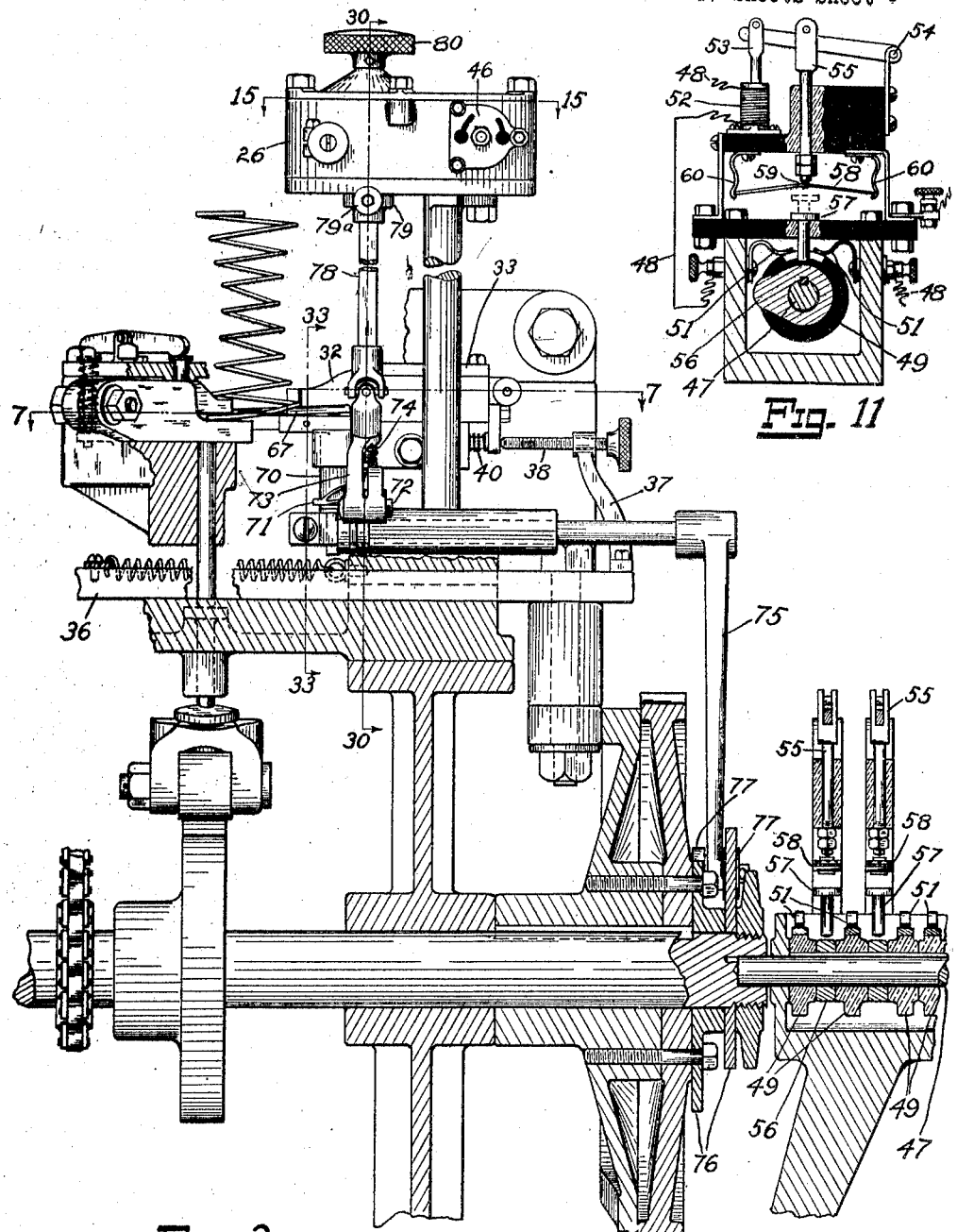

Jan. 15, 1924. 1,480,798
B. L. VAN ORMAN
WIRE SPRING MAKING MACHINE
Filed July 13, 1922 17 Sheets-Sheet 4
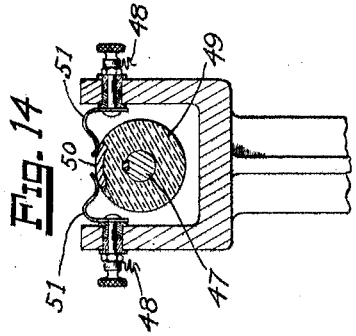
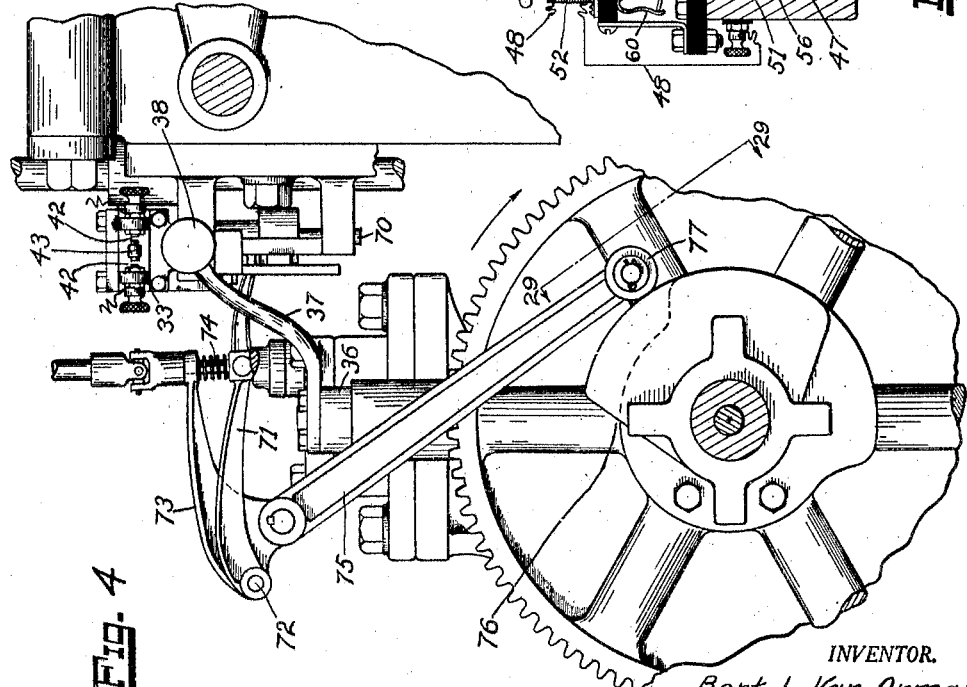
INVENTOR.
Bert L. Van Orman
BY
ATTORNEYS Jan. 15, 1924.  
B. L. VAN ORMAN  
1,480,798  
WIRE SPRING MAKING MACHINE  
Filed July 13, 1922  
17 Sheets-Sheet 5

INVENTOR.  
Bert L. Van Orman  
BY  
Chappell & Earl  
ATTORNEYS

Jan. 15, 1924.
B. L. VAN ORMAN
1,480,798
WIRE SPRING MAKING MACHINE
Filed July 13, 1922     17 Sheets-Sheet 6
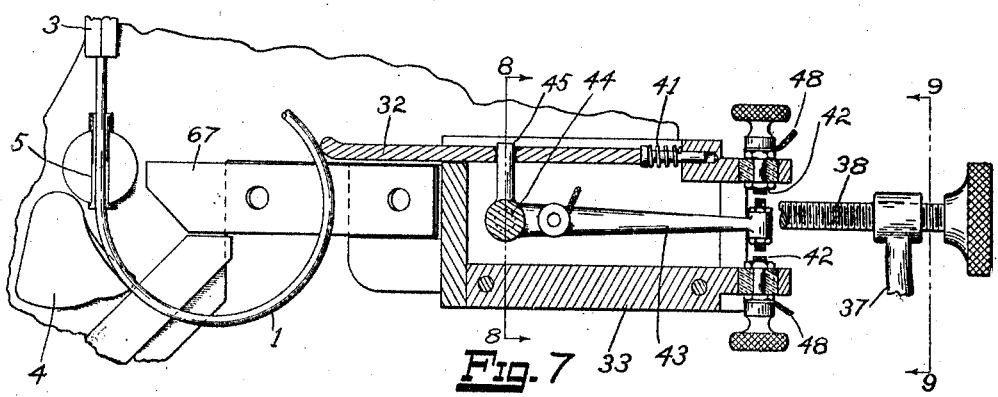
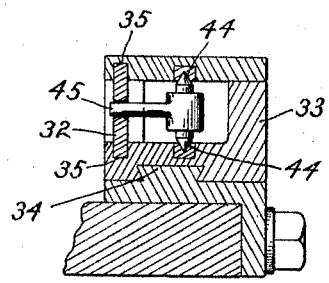
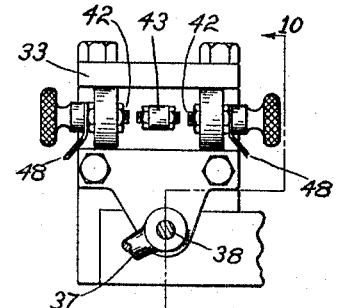
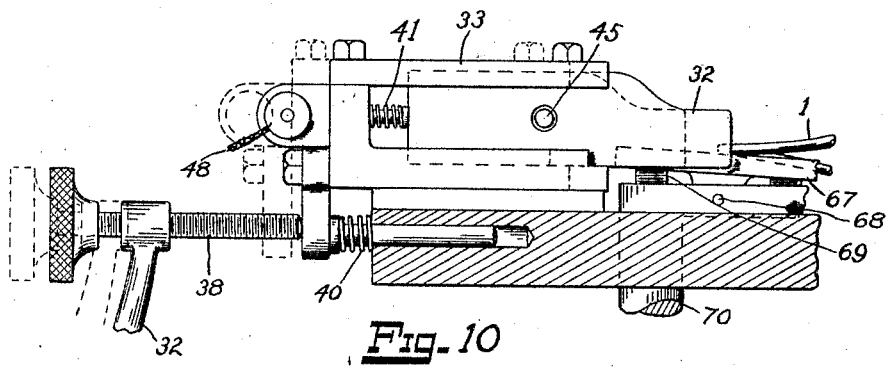
INVENTOR.
*Bert L. Van Orman*
BY
*Chappell & Earl*
ATTORNEYS Jan. 15, 1924.

B. L. VAN ORMAN 1,480,798

WIRE SPRING MAKING MACHINE

Filed July 13, 1922

17 Sheets-Sheet 7

INVENTOR.
Bert L. Van Orman
BY
Chappell & Earl
ATTORNEYS

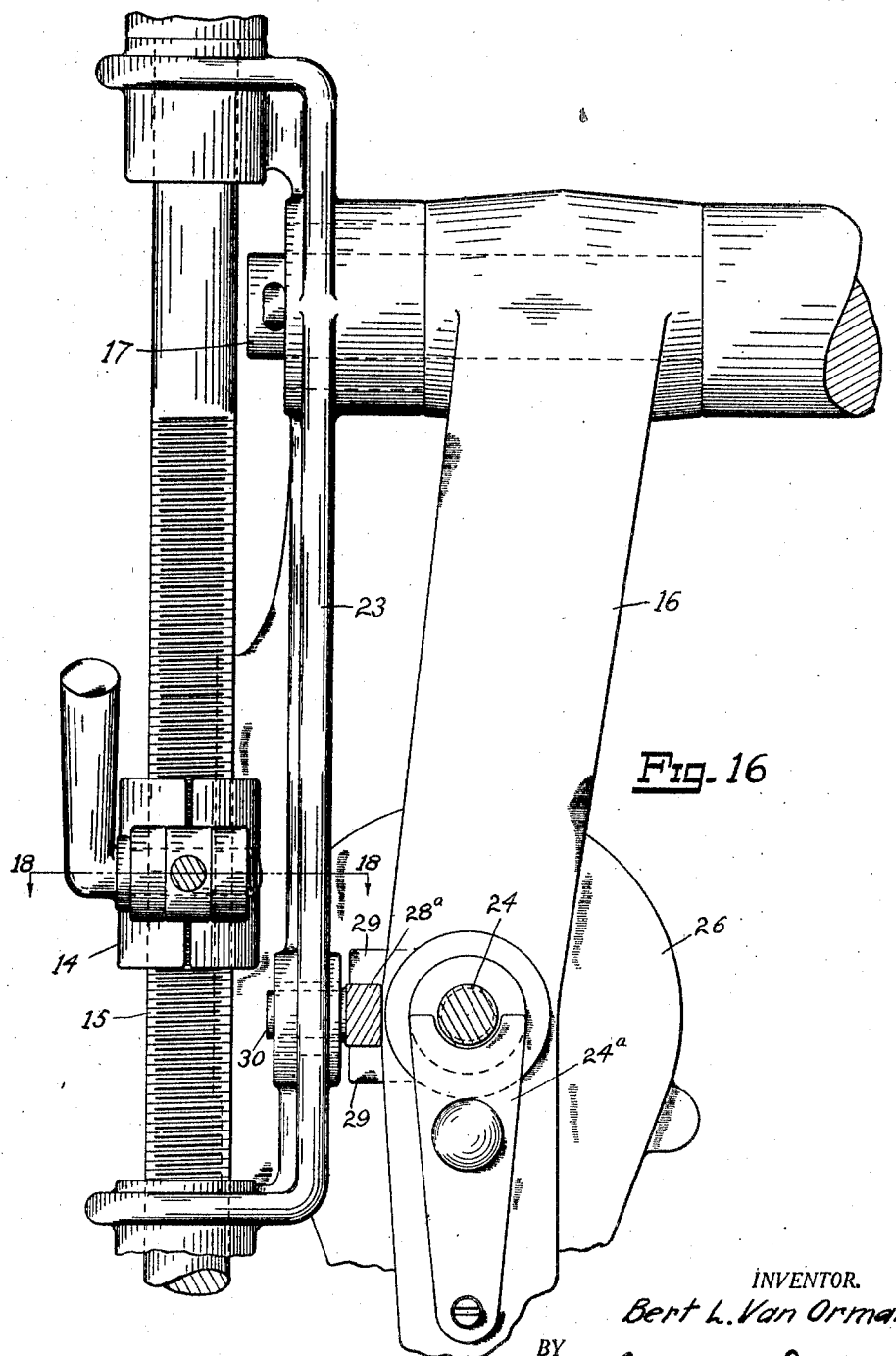

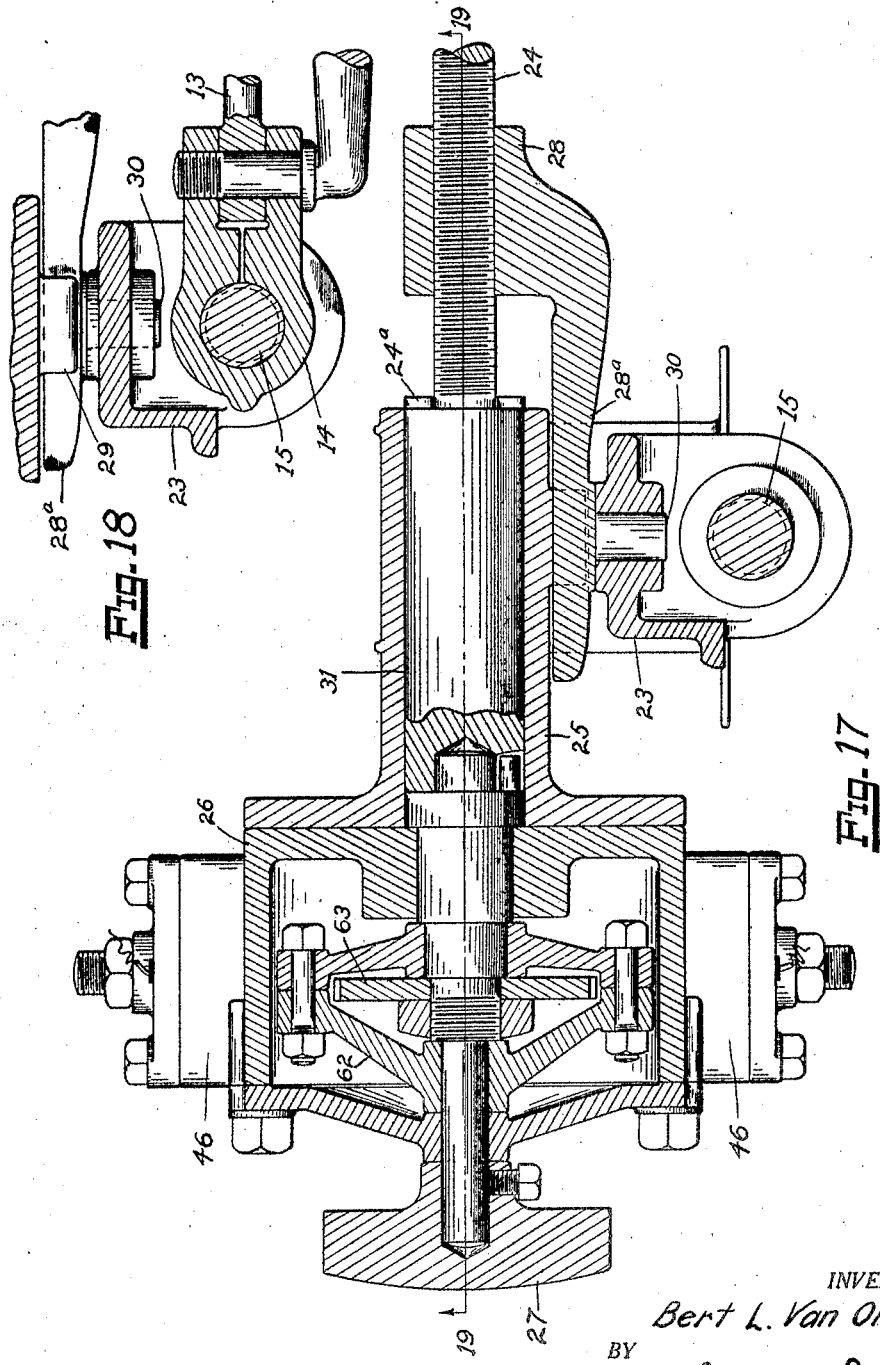

Jan. 15, 1924.  1,480,798
B. L. VAN ORMAN
WIRE SPRING MAKING MACHINE
Filed July 13, 1922   17 Sheets-Sheet 10
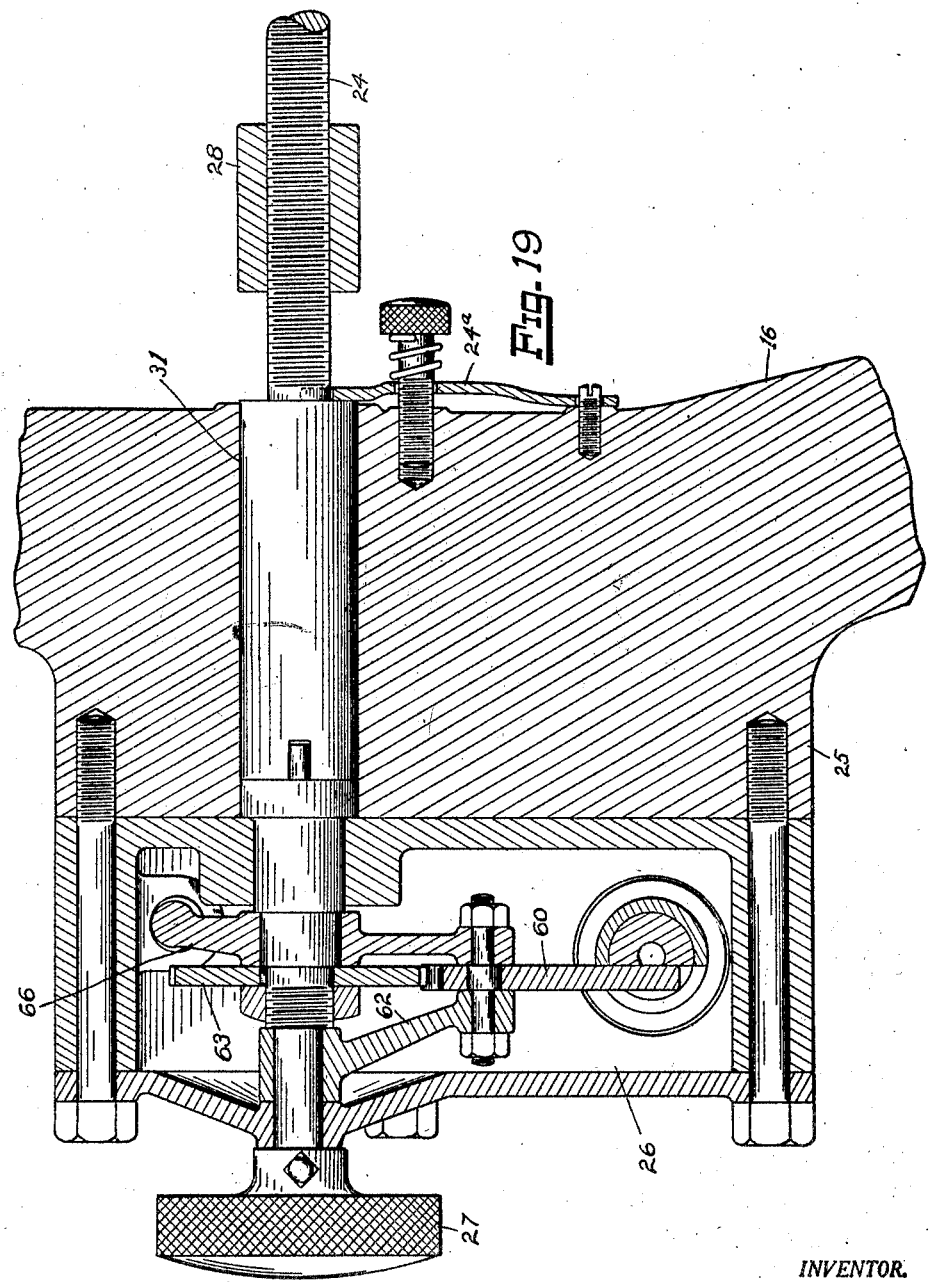
INVENTOR.
Bert L. Van Orman
BY
ATTORNEYS

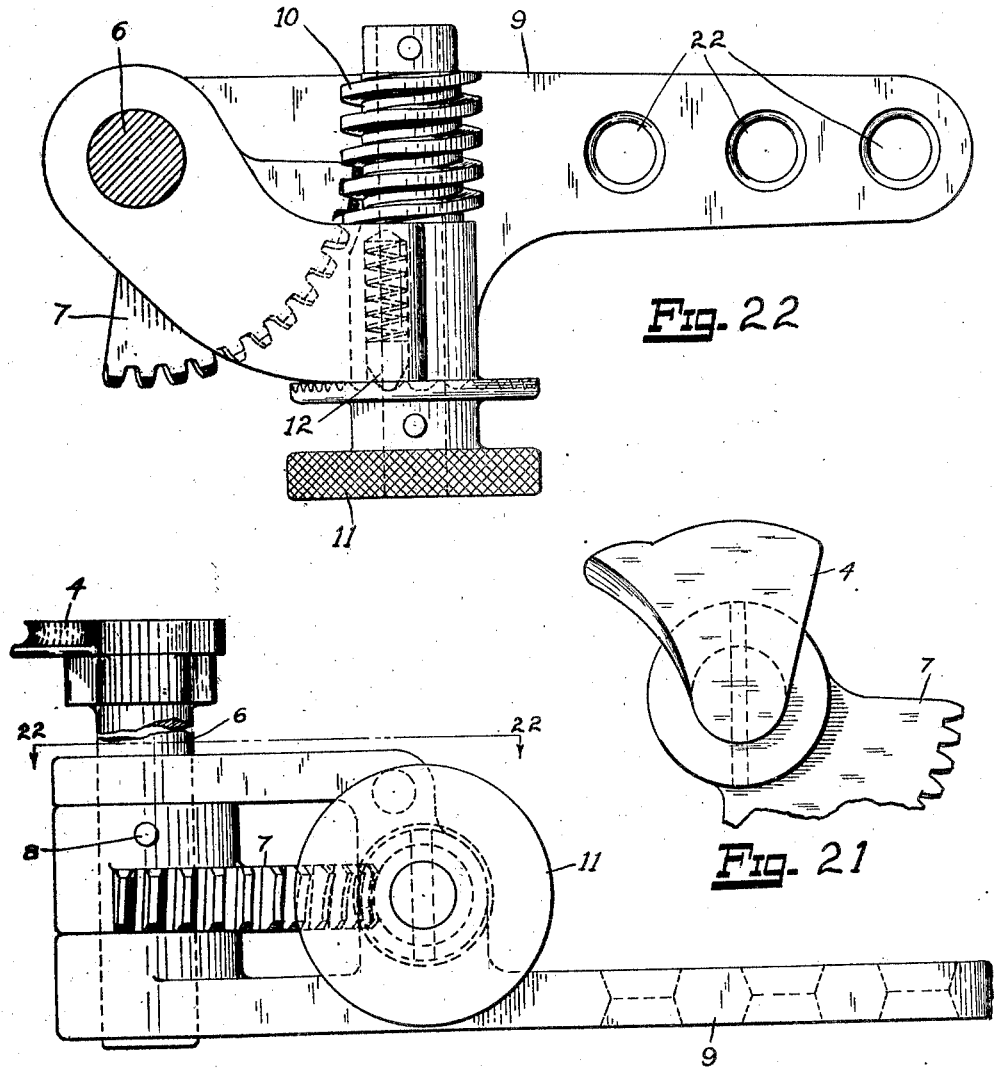

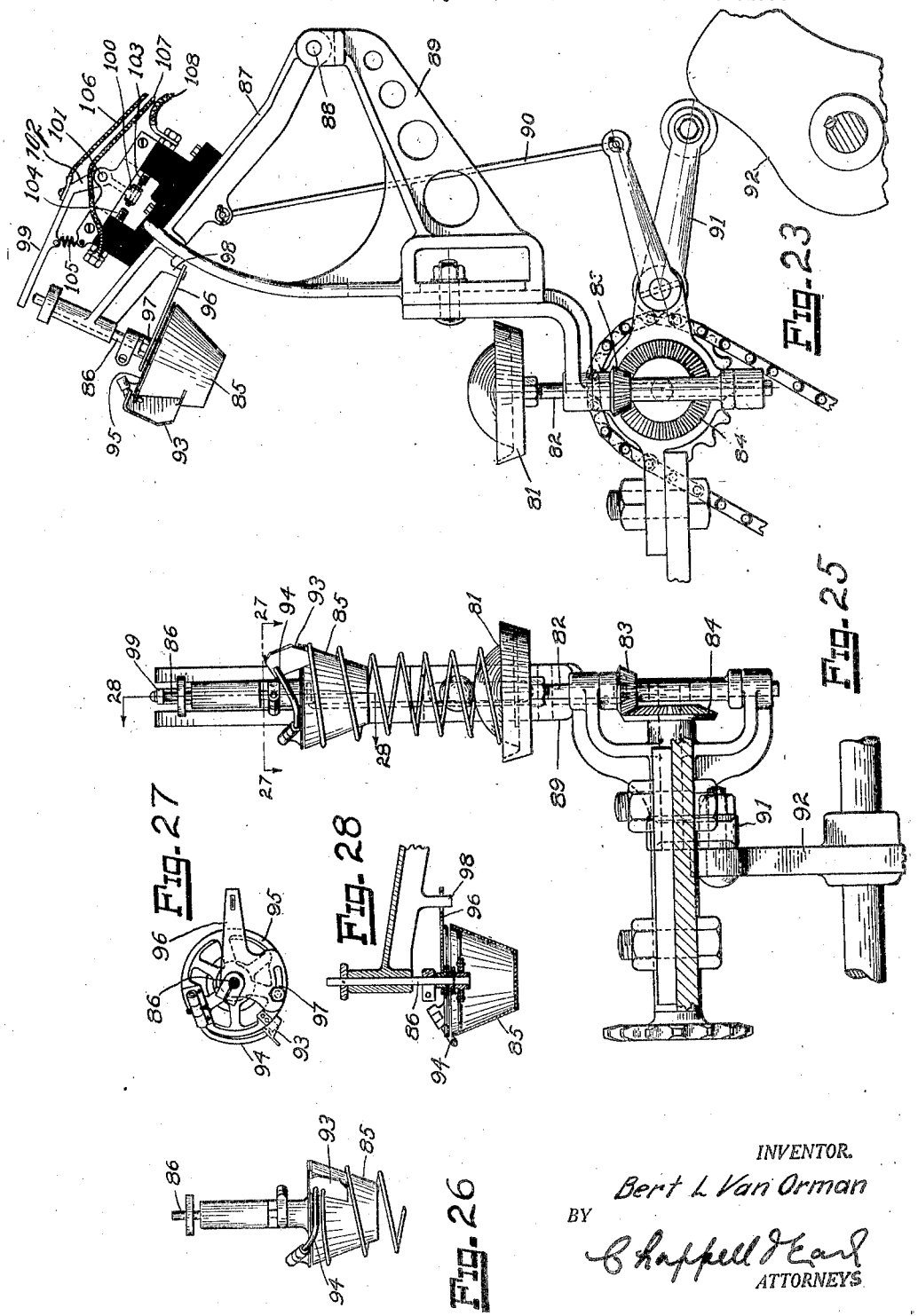

Jan. 15, 1924.
B. L. VAN ORMAN
1,480,798
WIRE SPRING MAKING MACHINE
Filed July 13, 1922   17 Sheets-Sheet 13
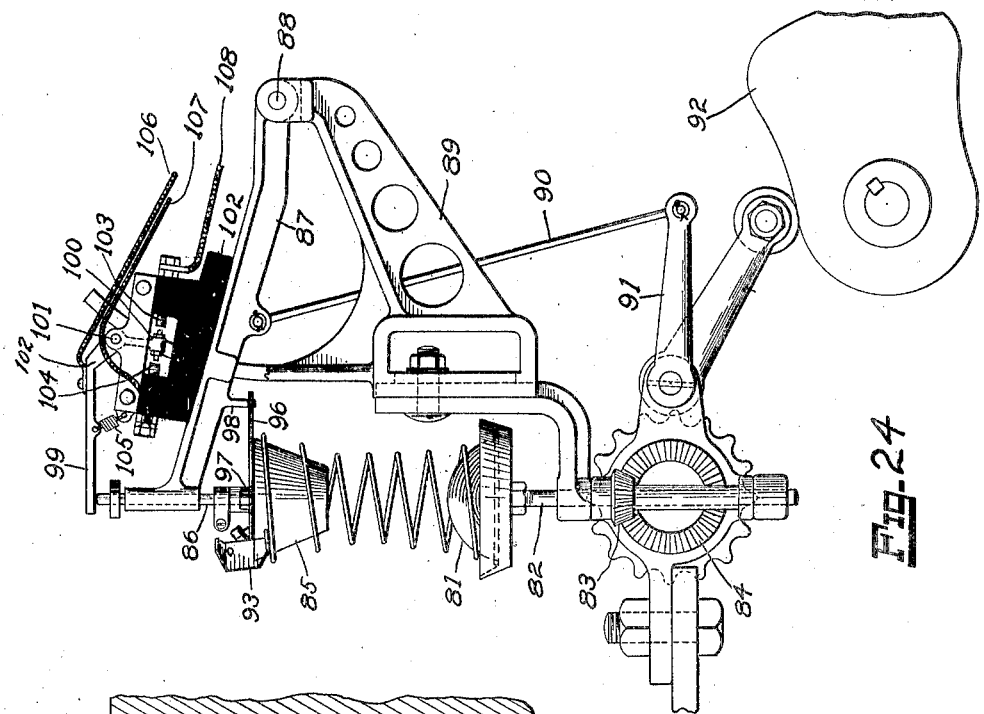
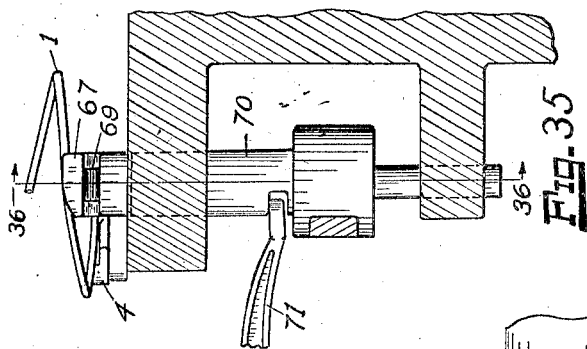
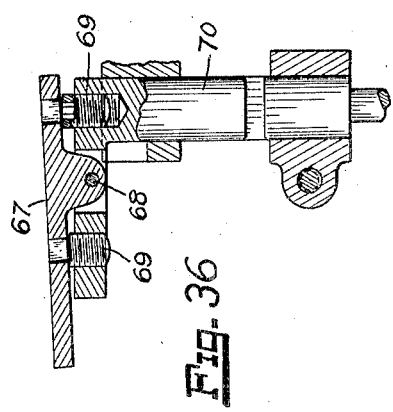
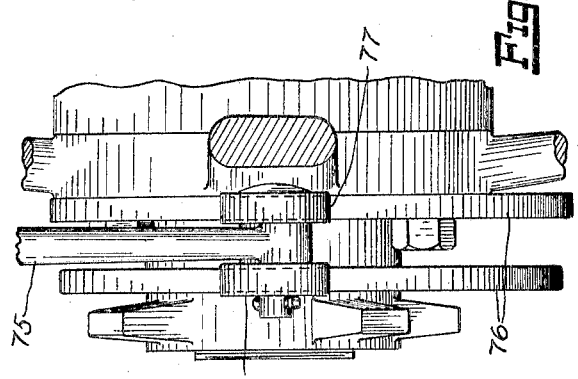
INVENTOR.
Bert L. Van Orman
BY
Chappell & Earl
ATTORNEYS

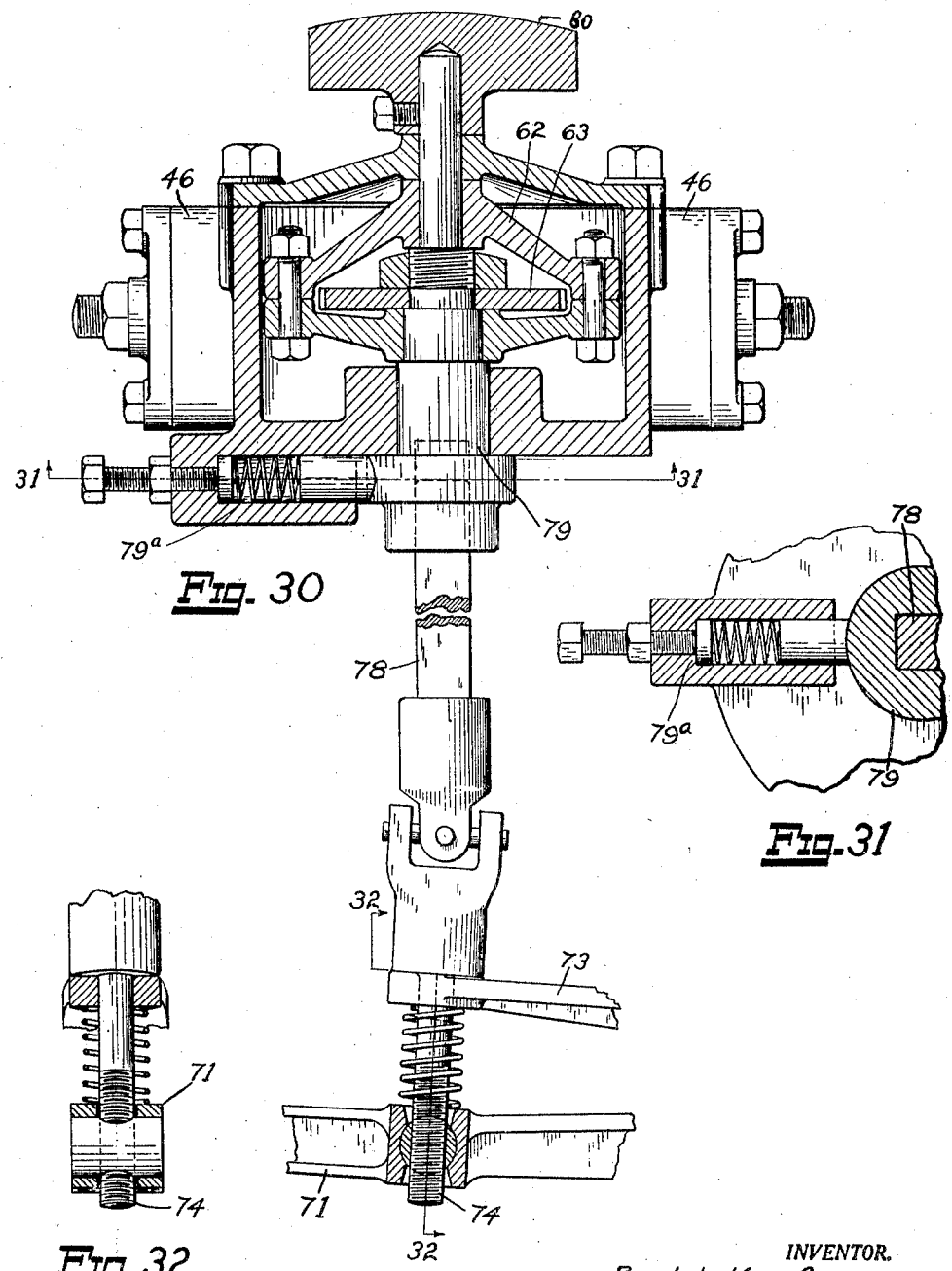

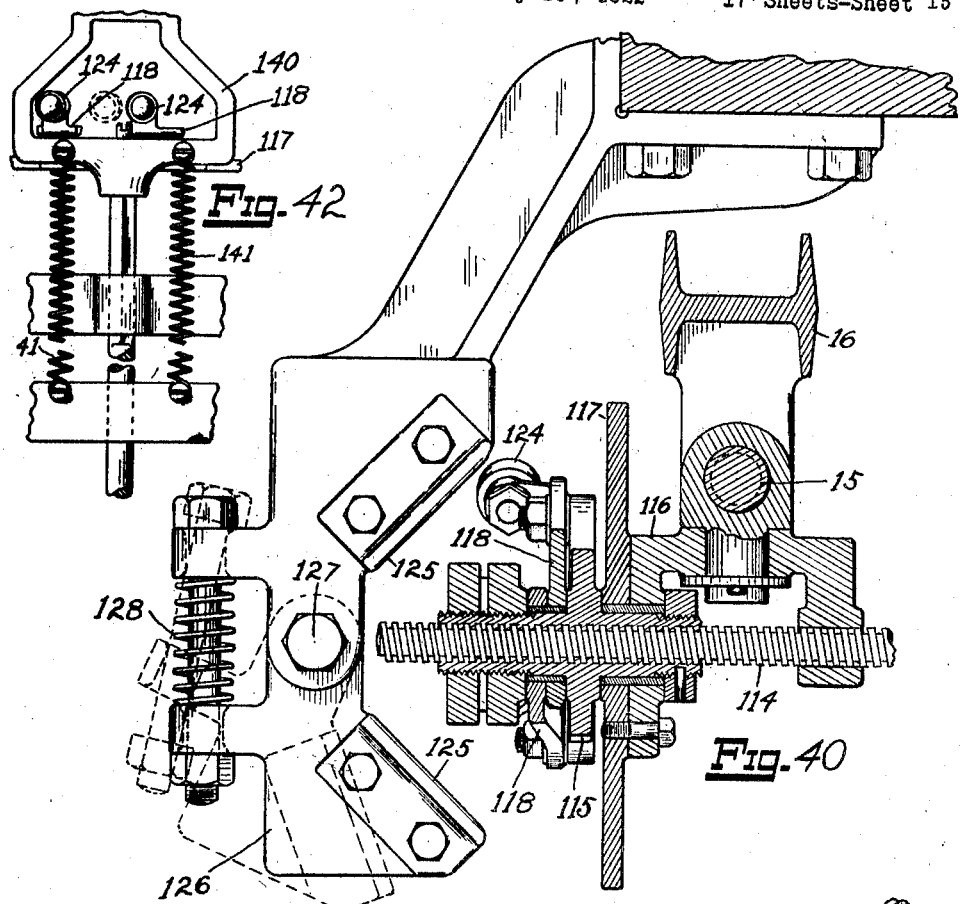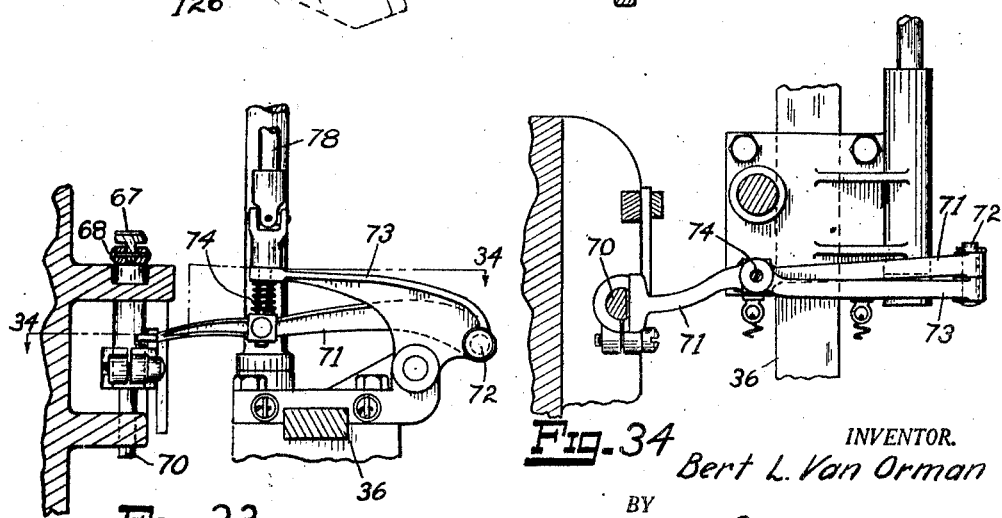

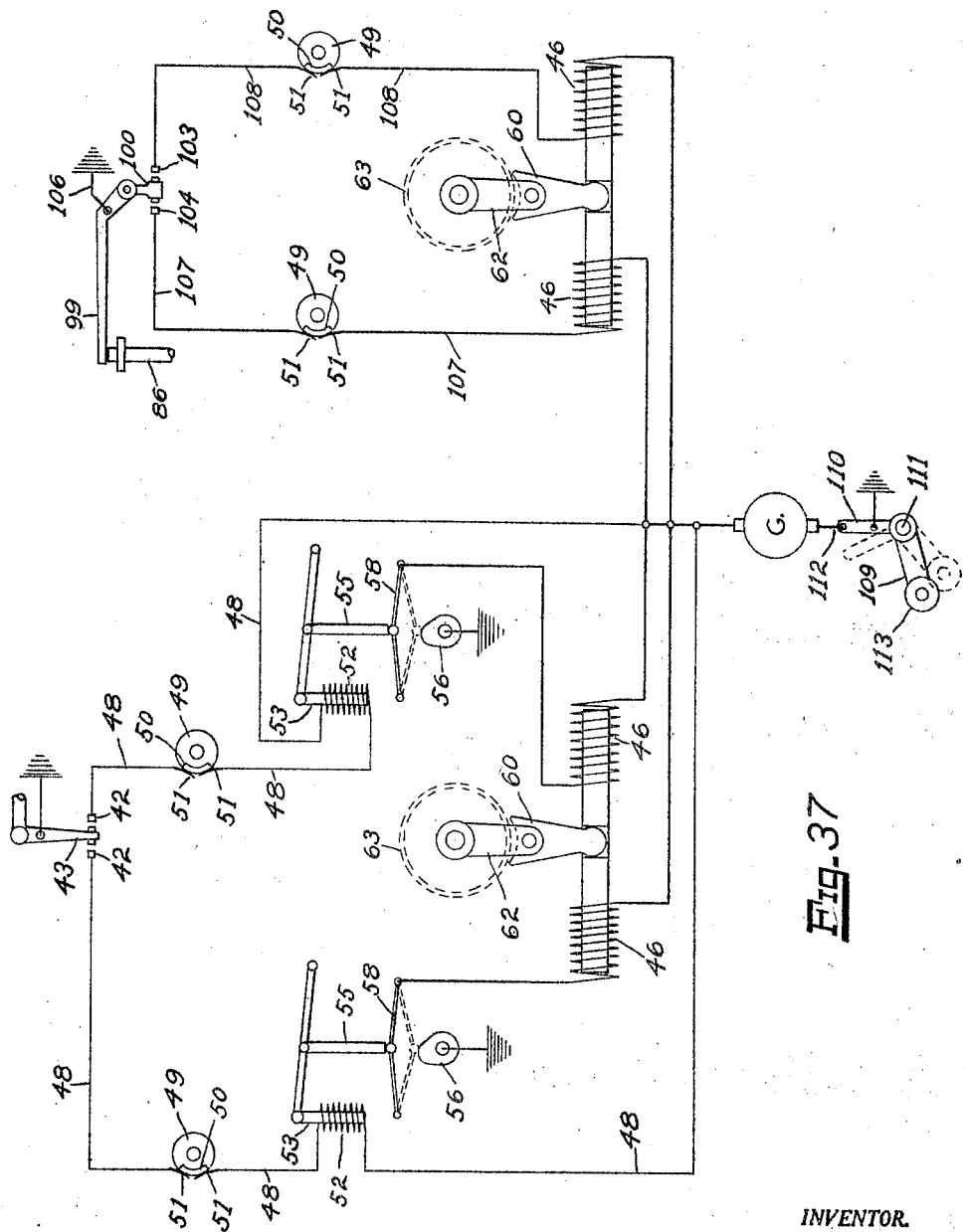

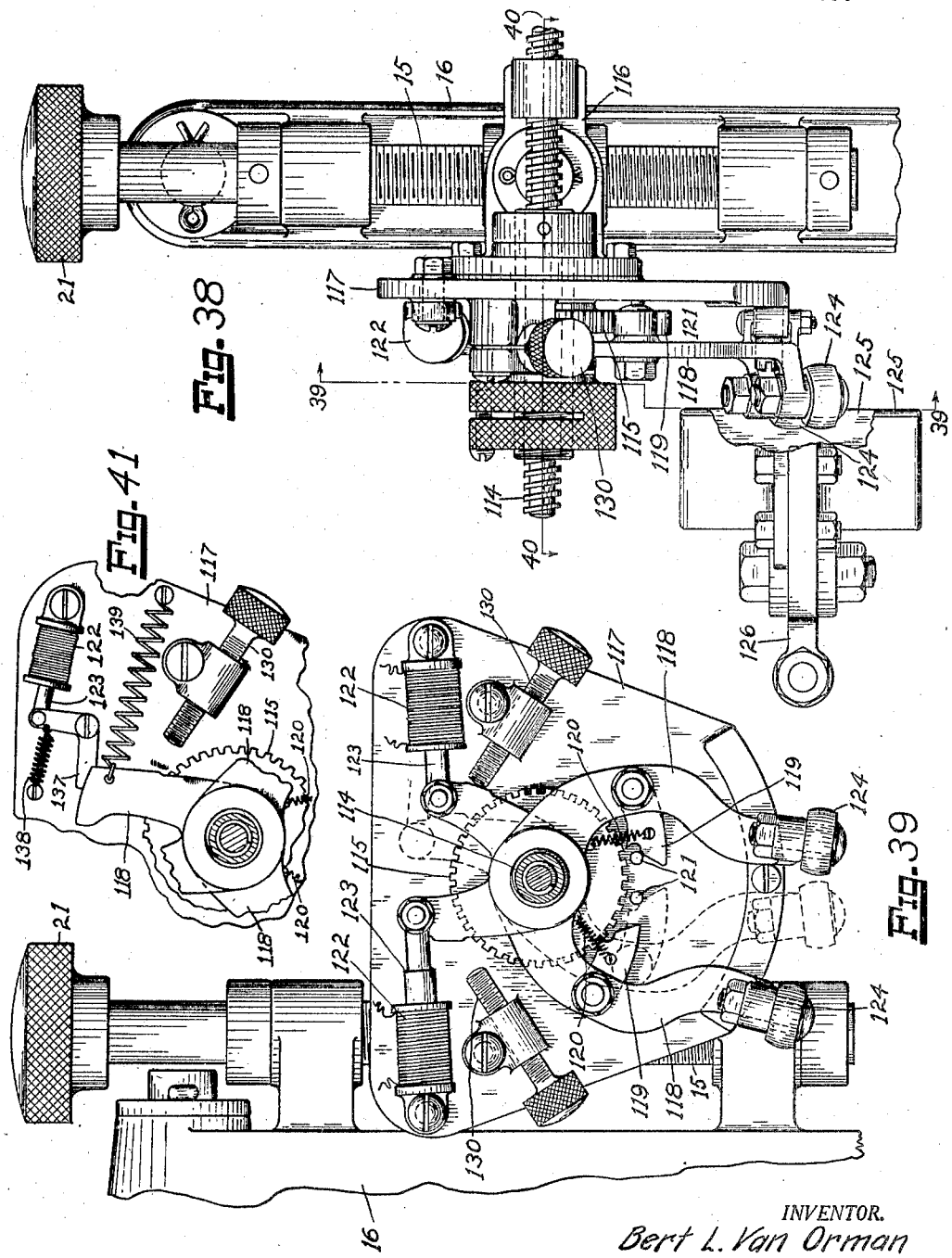

Patented Jan. 15, 1924.

1,480,798

UNITED STATES PATENT OFFICE.

BERT L. VAN ORMAN, OF DETROIT, MICHIGAN, ASSIGNOR TO L. A. YOUNG INDUSTRIES, INC., OF DETROIT, MICHIGAN.

WIRE-SPRING-MAKING MACHINE.

Application filed July 13, 1922. Serial No. 574,846.

*To all whom it may concern:*

Be it known that I, BERT L. VAN ORMAN, a citizen of the United States, residing at Detroit, county of Wayne, State of Michigan, have invented certain new and useful Improvements in Wire-Spring-Making Machines, of which the following is a specification.

This invention relates to improvements in wire spring making machines. My present improvements relate particularly to the type of wire spring making machines shown in my application for Letters Patent, filed June 2nd, 1921, Serial No. 474,399.

The main objects of this invention are:

First, to provide in a wire spring making machine, an improved governing means whereby uniform springs are produced from the wire which varies in gauge and hardness, as is the case with ordinary commercial wires adapted for spring making;

Second, to provide an improved wire spring making machine by means of which springs are produced with uniform size in the matter of coiled diameter and also in length;

Third, to provide an improved wire spring making machine in which the diameter of the coils and the height of the spring is automatically governed under varying conditions of stock;

Fourth, to provide an improved wire spring making machine which is very economical in the amount of wire consumed and that the forming means are automatically governed and adjusted to meet varying conditions of stock;

Fifth, to provide an improved wire spring making machine having the above and other advantages, and which will appear from the following description, which is invariably compact and durable in structure and not likely to become inoperative through breakage or wear.

Further objects and suggestions relating to details of the construction will appear from the following specifications.

Figure 6:
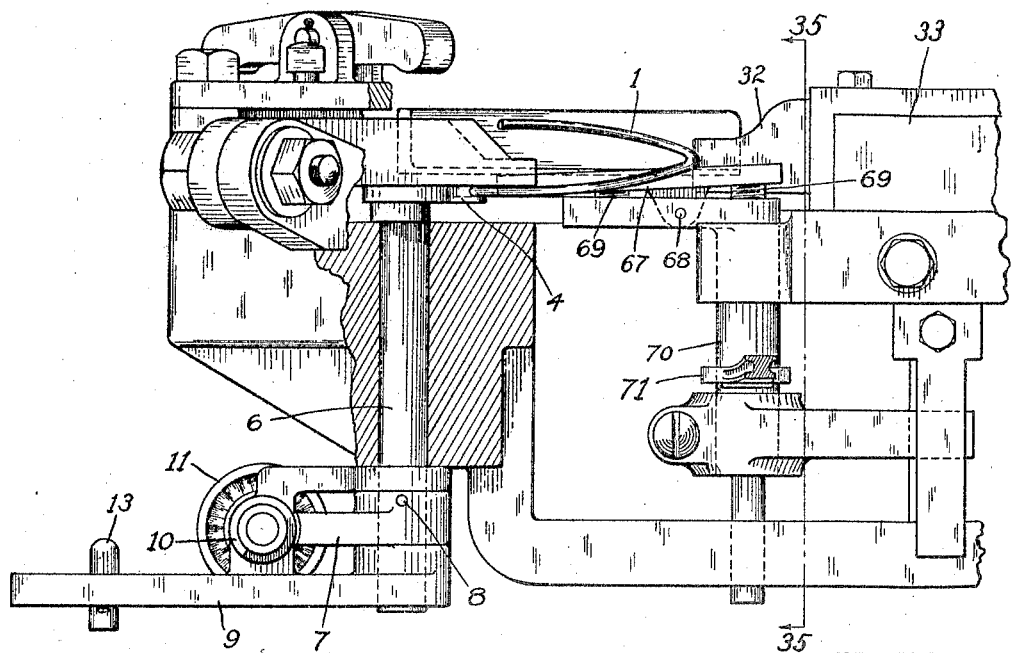
Figure 15:
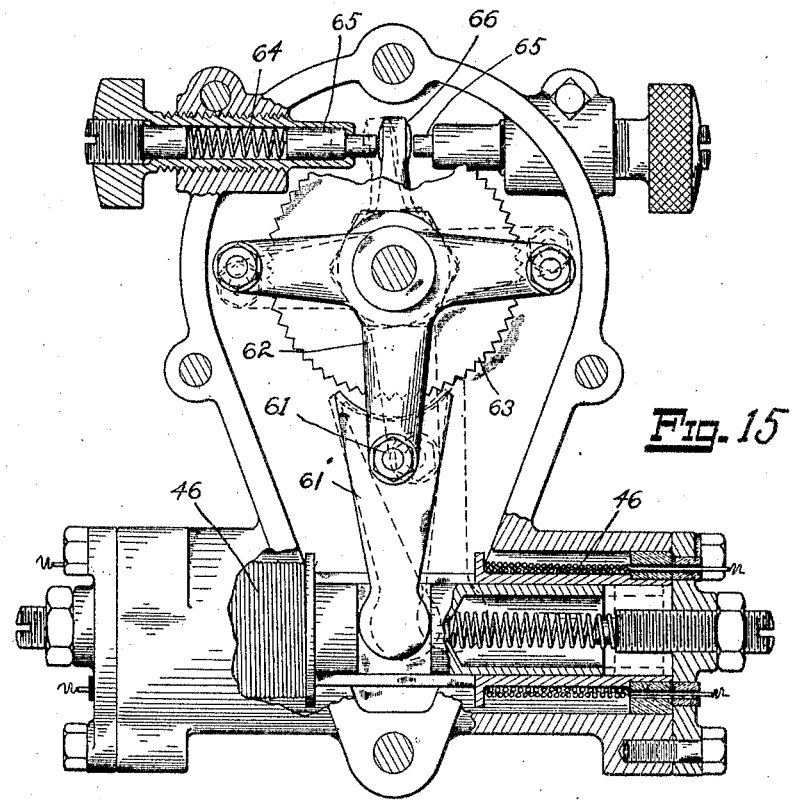
Figures 43, 44, 45:
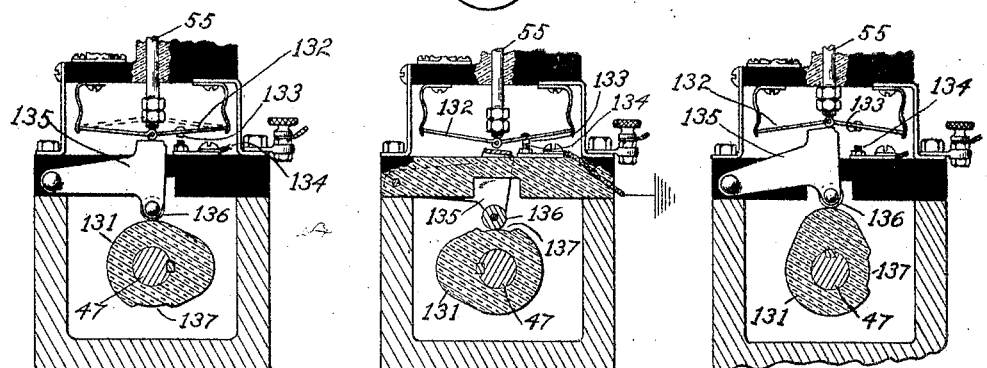

The structure embodying the features of my invention is illustrated in the accompanying drawings, forming part of the specifications in which Fig. 1, Sheet 1, is a plan view of a wire spring making machine embodying the features of my invention; parts of the wire feeding and guiding mechanism being omitted;

Fig. 2, Sheet 2, is a detail vertical section on a line corresponding to line 2—2 of Fig. 1;

Fig. 3, Sheet 3 is a detail view partially in vertical transverse section on a line corresponding to line 3—3 of Fig. 1 showing details of the coiler mechanism and also certain details of the governing means;

Fig. 4, Sheet 4, is a detailed view, partially in vertical section on a line corresponding to line 4—4 of Fig. 1, showing further details of the coiler governing mechanism;

Fig. 5, Sheet 5, is a fragmentary plan view of the coiling mechanism;

Fig. 6, Sheet 5, is a detailed view of the coiling mechanism partially in section on a line corresponding to line 6—6 of Fig. 5;

Fig. 7, Sheet 6, is a fragmentary view of the coiler and governor mechanism, partially in horizontal section on a line corresponding to line 7—7 of Fig. 3;

Fig. 8, Sheet 6, is a detailed vertical section on a line corresponding to line 8—8 of Fig. 7;

Fig. 9, Sheet 6, is a detailed view in section on a line corresponding to line 9—9 of Fig. 7;

Fig. 10, Sheet 6, is a detailed vertical transverse section on a line corresponding to line 10—10 of Fig. 9;

Fig. 11, Sheet 3, is a detailed section on a line corresponding to line 11—11 of Fig. 1, showing details of the governing actuating relays;

Figs. 12 and 13, Sheet 4, are detail sections corresponding to that of Fig. 11, showing the parts in different positions;

Fig. 14, Sheet 4, is a detailed section on a line corresponding with line 14—14 of Fig. 1, showing further details of the governor control mechanism;

Fig. 15, Sheet 7, is a detailed section on a line corresponding to line 15—15 of Figs. 2 and 3, showing details of the coiler adjusting and governing mechanism;

Fig. 16, Sheet 8, is a detailed view, partially in section, on a line corresponding to line 16—16 of Fig. 2, showing further details of the coiler control mechanism;

Fig. 17, Sheet 9, is a detailed view, partially in section, on a line corresponding to line 17—17 of Fig. 2, showing further details of the coiler control or governing mechanism;

Fig. 18, Sheet 9, is a detailed section on a line corresponding to line 18—18 of Fig. 16;

Fig. 19, Sheet 10, is a detailed view, partially in section on a line corresponding to line 19—19 of Fig. 17;

Fig. 20, Sheet 11, is a detailed elevation looking from the bottom of Fig. 22, showing details of the coiler mechanism;

Fig. 21, Sheet 11, is a fragmentary plan view of the coiler block;

Fig. 22, Sheet 11, is a detailed plan view of the coiler mechanism on a line corresponding with line 22—22 of Fig. 20;

Fig. 23, Sheet 12, is a detailed elevation on a line corresponding to line 23—23 of Fig. 1, showing details of the length and height governing means and locating means for the second knotter;

Fig. 24, Sheet 13, is a detailed elevation of the parts shown in Fig. 23 in actuated position;

Fig. 25, Sheet 12, is a detailed elevation looking from the left of Fig. 24;

Fig. 26, Sheet 12, is a detailed elevation of parts shown in Fig. 25 with the end of the top coil of the spring in engagement with the locating stop;

Fig. 27, Sheet 12, is a view on a line corresponding to line 27—27 of Fig. 25;

Fig. 28, Sheet 12, is a detail in vertical section on a line corresponding to line 28—28 of Fig. 25;

Fig. 29, Sheet 13, is a detailed section on a line corresponding to line 29—29 of Fig. 4, showing details of the actuating cam for the pitch control or regulating means;

Fig. 30, Sheet 14, is a detailed view, partially in vertical section on line 30—30 of Fig. 3, showing further details of the pitch control mechanism;

Fig. 31, Sheet 14, is a detailed section on a line corresponding to line 31—31 of Fig. 30;

Fig. 32, Sheet 14, is a detailed section on a line corresponding to line 32—32 of Fig. 30;

Fig. 33, Sheet 15, is a fragmentary view, partially in vertical section on a line corresponding to line 33—33 of Fig. 3, showing further details of the pitch adjusting and control mechanism;

Fig. 34, Sheet 15, is a detailed section on a line corresponding to line 34—34 of Fig. 33;

Fig. 35, Sheet 13, is a detailed vertical section of a line corresponding to line 35—35 of Fig. 6, Sheet 5, showing still further details of the spreader bar in operative relation to a spring coil;

Fig. 36, Sheet 13, is a detail of the spreader bar, partially in section on a line corresponding to line 36—36 of Fig. 35;

Fig. 37, Sheet 16, is a diagrammatic view of the wiring for the electrically controlled governing means;

Fig. 38, Sheet 17, is a detail view of a modified form or embodiment of the diameter governor mechanism;

Fig. 39, Sheet 17, is a detailed view, partially in vertical section on a line corresponding to line 39—39 of Fig. 38;

Fig. 40, Sheet 15, is a detailed section on a line corresponding to line 40—40 of Fig. 38;

Fig. 41, Sheet 17, is a detail view of a further modification of the diameter governing mechanism;

Fig. 42, Sheet 15, shows a further embodiment of the modification shown in Figs. 38, 39 and 40;

Figs. 43, 44 and 45, Sheet 7, are detailed vertical sections through a modified form of governor actuating relay, the parts being shown in different positions in the several figures.

In the accompanying drawings, similar reference numerals refer to similar parts throughout several views and the section views are taken looking in the direction of arrows at the ends of the section lines.

In the accompanying drawings, I have not attempted to illustrate the structural features of the frame as it will be understood that it is designed namely with a view of supporting the several parts in proper relation.

The wire bale supporting mechanism is not illustrated, but is preferably that shown in my copending application herein referred to.

A wire 1 is fed to the coiler mechanism by means of the feed rolls 2 arranged in co-acting pairs (see Fig. 2). The wire is fed by these feed rolls through a supporting and guide tube 3, it being projected against the coiler block 4, the second guide 5 supporting the wire as it is projected against the coiler block (see Fig. 7). The mounting of this coiler block is shown in detail in Figs. 20 to 22, sheet 11, the coiler blocking being mounted on the vertical rock shaft 6, having a segment 7 secured thereto by the pin 8 and adjustably connected to the arm 9 by the worm 10 mounted on the arm to co-act with the segment. The main purpose of this adjustable connection is to compensate for wear in the coiler block without changing the range of movement of the arm 9. The worm is provided with a knurled finger piece 11, a detent 12, shown by dotted lines in Fig. 22 holding the worm in its adjusted position.

The diameter of the coils is determined by the swinging or adjusting of the coiler block. This in general is old in manufacture of coiled springs, but I provide means for automatically governing the adjustment, thereby compensating for variations in the gauge and hardness and other variations in the wire which variations are incident to wire of this character.

The arm 9 is connected by the link 13 to a nut 14 on the screw 15 carried by the coiler block actuating lever 16. This lever is pivoted at 17 and I provide a roller 18 at its lower end co-acting with the cam 19. The lever is actuated in one direction and held against the cam by means of the coiled springs 20 (see Fig. 2, Sheet 2). The screw 15 is provided with a knurled adjusting knob 21 which enables the adjustment of the nut 14 up and down on the lever or nearer to or further from its pivot, thereby determining the amount of stroke of the arm 9 of the coiler block and through such adjustment, the relative size of the coils of the spring formed. It will be noted that the arm 9 is provided with a series of holes 22 with which the link 13 may be engaged to vary the stroke of the arm. This performs the same function as the adjustment of the nut 14, but provides for more rapid and greater adjustment, the screw and nut adjustment providing accuracy in the final setting or in slight changes. It is however intended that this adjustment shall be made only to change the type of spring, since the shape of the cam 19 determines the variation in the diameter of the coils; the cam illustrated being designed for an hourglass spring. These adjustments supplement the action of the cam 19 and provide means of lengthening or shortening the stroke of arm 9 without changing cams.

The screw 15 is carried by a yoke 23, illustrated in detail in Fig. 16, Sheet 8, to provide for automatic adjustment of the coiler block and also to provide for manual adjustment in setting the machine. An adjusting screw 24, which is mounted in a bracket 25 on the lever 16, projects through a housing 26 on the bracket and carries a knurled adjusting knob 27 at its outer end. On this screw is a nut 28 provided with an arm 28$^A$ sliding in guides 29 on the side of the lever 16 and connected to the yoke 23 by means of the pin 30 (see Figs. 17 and 18, Sheet 9). The screw 24 is supported by a bearing 31 to permit its rotation without longitudinal movement. As shown in the drawings, this screw is made up of several parts for convenience in manufacture and assembly, but as these form no part of my present invention, they are not described in detail. An adjustable brake 24$^A$ bears against a shoulder of the screw 24 with sufficient pressure to normally hold the screw in adjusted position and prevent backlash of the adjusting parts (see Figs. 2, 16 and 19). Adjustment of the nut 28 swings the yoke 23 on its pivot 17 and by lengthening or shortening the connection between the lever 16 and the arm 9 changes the amount of deflection of the coiler block, thereby changing the diameter of the next spring formed.

I will now describe the means for automatically adjusting this screw and thereby automatically controlling the coiler block.

I provide a gauge or testing finger 32 which is mounted on a reciprocating carriage 33, the carriage being slidably supported by the way or gib 34 (see detailed Figs. 7 to 10 inclusive. Sheet 6). This testing or gauge finger, which is in the form of a flat bar, is slidably mounted in grooves 35 in the carriage, (see Fig. 8, Sheet 6). The carriage is moved forward by the slide 36 (see Fig. 3) which has an upwardly projecting arm 37 carrying a tappet 38 threaded for adjustment (see Figs. 3 and 10). The coiled spring 40 returns the carriage or holds it normally in its retracted position. The gauge or testing finger 32 is yieldingly projected from the carriage 33 by a spring 41 (see Figs. 7 and 10) and engages a coil of the spring to be tested while the carriage is at the limit of its forward movement.

The carriage 33 is provided with a pair of contacts 42 arranged in opposed relation to co-act with the contact 43, pivoted at 44. This contact 43 has a finger 45 engaging the testing finger or gauge 32. When this finger 32 is in contact with a coil having the correct diameter, the contact 43 is held away from both of the contacts 42. If the diameter of the coil tested varies beyond the predetermined limit, the contact 43 is engaged with one of the contacts 42 thereby closing the circuit.

Electrical connections are provided from this testing or gauging mechanism to the actuating governor solenoids for the adjusting screw 24, to control the adjustment of the coiler block. These governor solenoids designated generally by the numerals 46 (see Fig. 15, Sheet 7). The connections are made through relays shown in Fig. 11, Sheet 3 and Figs. 12 and 13, Sheet 4. One of the main functions of the relay is to maintain the current on the actuating governor solenoids 46 for a sufficient period to effectively energize the same and a further advantage is to provide for the actuation of the solenoid during the period of idleness, the parts being under considerable stress during the working period or while the wire is being projected against the coiler block.

It will be understood that these relays are used in pairs, each of the contacts 42 being connected to a relay solenoid, through the wires 48, a timer being interposed in each circuit 48 (see the diagrammatic view of Fig. 37, Sheet 16). This timer prevents the magnets being energized while the carriage is in retracted position. This timer comprises a disc 49 of insulated material mounted on the shaft 47 and provided with a contact 50 with which the brushes 51 co-act, these brushes being connected in the circuit 48 (see Fig. 14). The solenoid coil 52 of the relay is also connected in this circuit 48. Its armature 53 is pivoted at 54 to actuate the plunger 55. The shaft 47 is provided with cams 56 which co-act with an insulated pin 57, the cam itself being grounded. When the solenoid 52 is actuated, the plunger 55 throws the contact 58 down to position to be engaged by the pin contact 57 (see Fig. 12). The contact 58 is formed of a pair of members hinged at 59 and supported at their outer ends by the springs 60 to secure a snap action. With the parts in position shown in Fig. 11, the circuit is broken. Whenever the contact 58 is actuated by the solenoid 52, it is engaged with the contact 57 and when that is raised by means of the cam 56 (see Fig. 13) the circuit to one of the actuating governor solenoids 46 is closed. These governor solenoids actuate the pawl 61' which is pivoted at 61 on the spider 62 (see Fig. 15). The ratchet wheel 63 is connected to the screw 24 so that through the actuation of the pawl for either direction the screw is turned, thereby adjusting the coiler block. The springs 64 acting on the pins 65 (see Figs. 15 and 19) co-act with an arm 66 connected to the spider to hold the pawl normally in disengaged position. With this arrangement of parts, the coiler block is automatically adjusted upon the varying of the coils as a spring is formed. This variation as is well known to those skilled in the manufacture of coiled springs, arises when there is a difference in the quality of the wire used.

From the coiler, the springs are transferred to the first knotter. I do not describe the details of the means of transferring from the coiler to the first knotter and the details of this first knotter as that forms no part of my present invention. It is deemed sufficient to point out and state that the first knotter ties the bottom coil and that springs are transferred from this first knotter which is located at A of Fig. 1, to the positioning and height or length gauging means, the transfer mechanism being indicated by the numeral B of Fig. 1.

Means for determining or regulating the height of the spring is best illustrated in detail in Figs. 3, 4, 6, 29, 33, 34, 35 and 36. As the coil is formed by the coiler block, the end of the wire passes over the pitch or spreader bar 67 which is pivoted at 68 and supported at each side of the pivots by the adjusting screws 69 (see Fig. 36). This block or bar 67 is carried by the plunger 70, reciprocated by means of the lever 71. This lever 71 is pivoted at 72 on the actuating lever 73, being connected thereto for adjustment by means of the screw 74 (see the details in Figs. 30 and 32). The lever 73 is provided with an arm 75 co-acting with the cam 76 (see Fig. 4). This arm 75 has a pair of rollers 77, the cam 76 being formed of two adjustable members so that by adjusting these to each other, the cam may be lengthened or shortened. This adjustment is made when it is desired to change the period during which the spreader is held in raised position. The screw 74 is connected by the shaft 78 (see Fig. 30) to a spindle 79 having a knurled adjusting knob 80 on its upper end to provide for manual adjustment. The shaft 78 is squared, splined or otherwise operatively connected to a corresponding socket in the spindle 79 so that the shaft is free to reciprocate with the movement of the levers 71 and 73, but is dependent upon the spindle for rotation. An adjustable brake 79^A offers sufficient resistance to the spindle 79 to prevent the parts from accidentally getting out of adjustment. The spindle 79 is provided with a ratchet mechanism, the same as that described for adjusting the screw 24 and therefore I have not illustrated the same in all its details but have applied the same reference numerals to corresponding parts.

The locating means for the second knotter and the height testing and governing means are best illustrated in Figs. 1 and 23 to 28 inclusive, Sheets 12 and 13; the spring forming mechanism having been previously described. The transfer mechanism B for transferring from the first knotter to this testing and governing mechanism delivers the springs with their knotted ends downward upon the support 81, supported by the vertical shaft 82 having a pinion 83 thereon driven from the gear 84 (see Fig. 23). The head 85 is supported by the spindle 86 on the swinging arm 87 pivoted at 88 on the bracket 89 of the frame. This arm is connected by the link 90 to a bell crank lever 91 actuated by the cam 92 so that the actuation is timed to engage it with the upper end of the spring as shown in Figs. 24 and 25. A positioning stop 93 is carried by an arm 94 mounted on a plate 95. This plate is adjustably connected to an arm 96 by a bolt and slot 97 (see Fig. 27) permitting the positioning of the stop. The arm 96 engages a lug 98 on the bracket 87 supporting the arm against rotation. When the head is engaged with the upper end of the spring, the stop is engaged by the top coil and is raised thereby as indicated in Fig. 25, the spring being rotated by the support 81 until its free end reaches the stop as shown in Fig. 26, thereby stopping the rotation of the spring and positioning it for the second knotter indicated at C, (see Fig. 1). The springs are transferred from the locating means to the second knotter by the mechanism indicated in general by the numeral D, the springs being reversed during this operation. The spindle 86 is supported for limited longitudinal movement and when the head 85 engages with the upper end of a spring, the spindle is raised or is positioned by each spring. The upper end of the spindle is adapted to co-act with the arm 99 of the contact 100 which is pivoted at 101 on an insulated support 102 carried by the head supporting arm 87. A pair of co-acting contacts 103 and 104 are provided. A coil spring holds the arm 99 yieldingly in normal position with its contact in engagement with the contact 103 as shown in Fig. 23. When the head 85 is in contact with a spring of the desired height, the contact 100 is held away from both contacts 103 and 104 as shown in Fig. 24. When a tested spring is above a predetermined height the contact 100 is engaged with the contact 104 thus actuating the spacer bar adjusting mechanism of Fig. 30 to decrease the lift of the spreader bar 67. The circuit wire 106, shown in Figs. 23 and 24 is grounded and the circuit wires 107 and 108 are connected to one of the governor solenoids 46 of the adjusting mechanism of Fig. 30, the circuit passing through a timer such as has been described and as shown in Figs. 1, 3 and 14, see also the wiring diagram of Fig. 37, Sheet 16. If the tested spring is below the predetermined height the contact 100 engages with the contact 103 and throws the opposite governor solenoid into action, thereby increasing the height to which the spreader bar is lifted.

With this arrangement of parts, each spring is tested as to height and the spacer or pitch bar 67 automatically adjusted through this governing means. This in connection with the diameter testing and governing means results in springs of a uniform diameter and length, which is not only an advantage in the matter of uniform product, but also results in a saving of a considerable percentage of stock or material, as ordinarily in the coiling of springs, there is a variation ranging from three to eight per cent in the matter of stock consumed.

To prevent the governing means from getting out of adjustment in case the machine is operated idly, I provide a safety controlling switch which is opened by the exhaust of the wire. This is shown in Figs. 1 and 2, Sheets 1 and 2 and is also shown in the diagrammatic view of Fig. 37, Sheet 16. It consists of an arm 109 connected to the switch member designated generally by the numeral 110 which is pivoted at 111 to co-act with the contact 112 connected in the operating circuit, the contact of the switch 110 being connected with the ground circuit. The arm 109 is provided with a roller 113 which is adapted to rest upon the wire 1 as it is fed into the machine (see Fig. 2). When the supply of wire is exhausted, the arm 109 falls as indicated by dotted lines in Fig. 2, opening this master switch.

In the modified form of my invention shown in Figs. 38—39—40, Sheets 17 and 15, the connecting rod 13 is provided with a screw 114. An adjusting ratchet wheel 115 is provided for this screw, the ratchet being provided with a hub supported in a suitable bearing in the bracket 116. This bracket 116 is carried by the screw 15. A supporting plate 117 is mounted on the bracket for certain operating parts as shown in the drawings. The pawl carriers 118 are mounted on the hub of the ratchet wheel 115 for oscillating movement, the pawls 119 being pivotally mounted on these carriers and urged toward the ratchet wheel by the springs 120. Pins 121 on the plate 117 disengage these pawls when the carriers are swung to the limit of their work stroke. The pawls are retracted by means of the solenoids 122, the armatures 123 of which are connected with the upwardly projecting arms of the pawl carriers as shown in Fig. 39. The carriers 118 are provided with rollers 124 which when the arms are in retracted position are engaged by the readjusting cams 125. As the lever 16 is swung rearwardly, the rollers 124 if in set position are brought into contact with these cams and actuated to turn the ratchet. As a safety means, or to prevent breakage in case both of the arms 118 should be set at the same time, one of the cams 125 is mounted on a movable section of the supporting bracket, this section being pivoted at 127 and yieldingly held in operative position by the coiled spring 128. The movement of this part under these abnormal conditions is indicated by dotted lines in Fig. 40.

I thus provide an actuating means for the governor in which the only work done with solenoids is to set the pawls for work, the pawls being actuated on their work stroke by mechanical means. The length of the pawl stroke is determined by the adjustable stops 130. The adjusting mechanism is actuated when the lever 16 is nearing its position of idleness and the coiler parts are under little stress. This advantage together with the small amount of work required of the solenoid 122, allows the elimination of relays from the electrical circuits.

Fig. 41 shows a modification of the mechanism shown in Figs. 38, 39 and 40, in which each of the actuating levers 118 is normally locked in neutral position by a latch 137 that is held in contact with the upper end of the lever by a spring 138. When released by a pull from the solenoid 122, the lever 118 is set by a spring 139. With this arrangement of parts, the pawl carriers 118 are actuated mechanically on both strokes, the solenoids serving only to trip the latches 137 whenever adjustments are needed.

In the modification shown in Figs. 42, 43 and 44, Sheet 7, the cam 131 is insulated instead of being grounded as has been described for the previous embodiment. The contacts 132 are provided with a contact point 133 which co-acts with a contact 134 connected to the ground. Instead of the plunger pin 27 of Fig. 11 a swinging arm 135 is provided to co-act with the contact 132. In this embodiment the circuit is closed when the roller 136 of the arm 135 drops into a recess 137 of the cam (see Fig. 42). The operation is substantially that of the structure previously described.

Having thus described my invention, what I claim as new and desire to secure by Letters Patent, is:—

1. In a structure of the class described, the combination of a coiler block, a rock shaft on which said coiler block is mounted, an arm on said rock shaft, an actuating link connected to said arm, an actuating lever, an adjustable connection for said link to said lever comprising a screw disposed longitudinally of the lever and provided with a nut to which said link is connected, a pivoted support for said screw, a governor screw carried by said lever and disposed transversely thereof, a nut on said governor screw provided with an arm connected to said support, a ratchet wheel secured to said governor screw, a pawl carrier mounted to oscillate on said screw, a pawl mounted on said pawl carrier to coact with said ratchet wheel for turning the screw in either direction, means for returning said pawl carrier to its initial position, a pair of solenoids operatively associated with said pawl, and means for controlling said solenoids including a testing means.

2. In a structure of the class described, the combination of a coiler block, a rock shaft on which said coiler block is mounted, an arm on said rock shaft, an actuating link connected to said arm, an actuating lever, an adjustable connection for said link to said lever comprising a screw disposed longitudinally of the lever and provided with a nut to which said link is connected, a pivoted support for said screw, a governor screw carried by said lever and disposed transversely thereof, a nut on said governor screw provided with an arm connected to said support, a ratchet wheel secured to said governor screw, a pawl carrier mounted to oscillate on said screw, a pawl mounted on said pawl carrier to coact with said ratchet wheel for turning the screw in either direction, means for returning said pawl carrier to its initial position, and means for automatically actuating said pawl including a testing means.

3. In a structure of the class described, the combination of a coiler block, a rock shaft on which said coiler block is mounted, an arm on said rock shaft, an actuating link connected to said arm, an actuating lever, an adjustable connection for said link to said lever comprising a screw disposed longitudinally of the lever and provided with a nut to which said link is connected, a pivoted support for said screw, a governor screw carried by said lever and disposed transversely thereof, a nut on said governor screw provided with an arm connected to said support, a ratchet wheel secured to said governor screw, a pawl coacting with said ratchet wheel for turning the screw in either direction, a pair of solenoids operatively associated with said pawl, and means for controlling said solenoids including a testing means.

4. In a structure of the class described, the combination of a coiler block, a rock shaft on which said coiler block is mounted, an arm on said rock shaft, an actuating link connected to said arm, an actuating lever, an adjustable connection for said link to said lever comprising a screw disposed longitudinally of the lever and provided with a nut to which said link is connected, a pivoted support for said screw, a governor screw carried by said lever and disposed transversely thereof, a nut on said governor screw provided with an arm connected to said support, a ratchet wheel secured to said governor screw, a pawl coacting with said ratchet wheel for turning the screw in either direction, and means for automatically actuating said pawl.

5. In a structure of the class described, the combination of wire feed means, a coiler block, a rock shaft on which said coiler block is mounted, an arm adjustable on said rock shaft, a segment fixed to said rock shaft, a worm carried by said arm coacting with said segment whereby the arm may be adjusted on the rock shaft, an actuating link connected to said arm, an actuating lever, an adjustable connection for said link to said lever comprising a governor screw, a ratchet wheel secured to said governor screw, a pawl carrier mounted to oscillate on said screw, a pawl mounted on said pawl carrier to coact with said ratchet wheel for turning the screw in either direction, and actuating means for said pawl including a coil testing means.

6. In a structure of the class described, the combination of wire feed means, a coiler block, a rock shaft on which said coiler block is mounted, an arm on said rock shaft, an actuating link connected to said arm, an actuating lever, an adjustable connection for said link to said lever comprising a governor screw, a ratchet wheel secured to said governor screw, a pawl carrier mounted to oscillate on said screw, a pawl mounted on said pawl carrier to coact with said ratchet wheel for turning the screw in either direction, and actuating means for said pawl including a coil testing means.

7. In a structure of the class described, the combination of wire feed means, a coiler block, a rock shaft on which said coiler block is mounted, an arm adjustable on said rock shaft, a segment fixed to said rock shaft, a worm carried by said arm coacting with said segment whereby the arm may be adjusted on the rock shaft, an actuating link connected to said arm, an actuating lever, an adjustable connection for said link to said lever comprising a governor screw, a ratchet wheel secured to said governor screw, a pawl coacting with said ratchet wheel for turning the screw in either direction, and actuating means for said pawl including a coil testing means.

8. In a structure of the class described, the combination of wire feed means, a coiler block, a rock shaft on which said coiler block is mounted, an arm on said rock shaft, an actuating link connected to said arm, an actuating lever, an adjustable connection for said link to said lever comprising a governor screw, a ratchet wheel secured to said governor screw, a pawl coacting with said ratchet wheel for turning the screw in either direction, and actuating means for said pawl including a coil testing means.

9. In a structure of the class described, the combination of a coiler block, a rock shaft on which said coiler block is mounted, an arm adjustable on said rock shaft, a segment fixed to said rock shaft, a worm carried by said arm coacting with said segment whereby the arm may be adjusted on the rock shaft, and an actuating means operatively associated with said arm.

10. In a structure of the class described, the combination of a coiler block, an actuating lever, an actuating link, an adjustable connection for said link to said lever comprising a screw disposed longitudinally of the lever and provided with a nut to which said link is connected, a pivoted support for said screw, a governor screw carried by said lever and operatively associated with said support, a ratchet wheel secured to said governor screw, a pawl coacting with said ratchet wheel for turning the screw in either direction, a pair of solenoids operatively associated with said pawl, and means for controlling said solenoids including testing means.

11. In a structure of the class described, the combination of a coiler block, an actuating lever, an actuating link, an adjustable connection for said link to said lever comprising a screw disposed longitudinally of the lever and provided with a nut to which said link is connected, a pivoted support for said screw, a governor screw carried by said lever and operatively associated with said support, a ratchet wheel secured to said governor screw, a pawl coacting with said ratchet wheel for turning the screw in either direction, and means for actuating said pawl including a testing means.

12. In a structure of the class described, the combination of a coiler block, an actuating lever, an actuating link, an adjustable connection for said link to said lever comprising a screw disposed longitudinally of the lever and provided with a nut to which said link is connected, a pivoted support for said screw, and a screw carried by said lever and operatively associated with said support.

13. In a structure of the class described, the combination of an intermittently acting wire feed means, a movably mounted coiler block, actuating means for said coiler block having an adjustable connection thereto including a governor screw, a ratchet wheel secured to said governor screw, an oscillating pawl carrier, a double acting pawl coacting with said ratchet wheel, means for holding said pawl normally disengaged from said ratchet wheel, an electrically operated means for actuating said pawl, means for controlling said electrical operating means including a testing device, and timing means whereby the adjusting means is actuated only during the periods of rest of said feed means.

14. In a structure of the class described, the combination of an intermittently acting wire feed means, a movably mounted coiler block, actuating means for said coiler block having an adjustable connection thereto including a governor screw, a ratchet wheel secured to said governor screw, a double acting pawl coacting with said ratchet wheel, an electrically operated means for actuating said pawl, means for controlling said electrical operating means including a testing device, and timing means whereby the adjusting means is actuated only during the periods of rest of said feed means.

15. In a structure of the class described, the combination of a movably mounted coiler block, actuating means for said coiler block having an adjustable connection thereto including a governor screw, a ratchet wheel secured to said governor screw, an oscillating pawl carrier, a double acting pawl coacting with said ratchet wheel, means for holding said pawl normally disengaged from said ratchet wheel, an electrically operated means for actuating said pawl, and means for controlling said electrical operating means including a testing device.

16. In a structure of the class described, the combination of a movably mounted coiler block, actuating means for said coiler block having an adjustable connection thereto including a governor screw, a ratchet wheel secured to said governor screw, a double acting pawl coacting with said ratchet wheel, an electrically operated means for actuating said pawl, and means for controlling said electrical operating means including a testing device.

17. In a structure of the class described, the combination of an intermittently acting wire feed means, a movably mounted coiler block having an adjustable connection thereto including a screw, an electrically operated means for actuating said screw, means for controlling said electrical operating means including a testing device, and timing means whereby the adjusting means is actuated only during the periods of rest of said feed means.

18. In a structure of the class described, the combination of a coiler member, means for actuating said coiler member including an adjusting screw, a ratchet wheel secured to said screw, a pawl carrier mounted to oscillate on said screw, a pawl mounted on said pawl carrier to coact with said ratchet wheel for turning the screw in either direction, means for returning said pawl carrier to its initial position, a pair of solenoids operatively associated with said pawl, and means for controlling said solenoids including a testing means.

19. In a structure of the class described, the combination of a coiler member, means for actuating said coiler member including an adjusting screw, a ratchet wheel secured to said screw, a pawl coacting with said ratchet wheel for turning the screw in either direction, a pair of solenoids operatively associated with said pawl, and means for controlling said solenoids including a testing means.

20. In a structure of the class described, the combination of an intermittently acting wire feed means, a coiler block, an actuating means having an adjustable connection to said coiler block comprising a screw, means for rotating said screw in both directions comprising a pair of solenoids, a control means for said solenoids including a coil testing means, pairs of relay solenoids operatively associated with said testing means, and timing means interposed between said relay solenoids and said governor solenoids whereby the actuation of the governor solenoids occurs during the pauses in the wire feed.

21. In a structure of the class described, the combination of a coiler block, an actuating means having an adjustable connection to said coiler block, comprising a screw, means for rotating said screw in both directions comprising a pair of solenoids, and a control means for said solenoids including a coil testing means.

22. In a structure of the class described, the combination of a coiler member, means for actuating said coiler member including an adjusting screw, a pair of solenoids operatively associated with said screw, and means for controlling said solenoids including a testing means.

23. In a structure of the class described, the combination of a coiler block, an actuating lever, an adjustable operating connection for said lever to said coiler block including a screw, and an adjusting means for said screw including a means for testing the coils as formed by said coiler block.

24. In a structure of the class described, the combination of a coiler member, an actuating means therefor, an adjustable operating connection for said lever to said coiler member including a screw, and an adjusting means for said screw including a means for testing the springs as formed by said coiler member.

25. In a structure of the class described, the combination of an intermittently acting wire feed means, a movable coiler member, means for actuating said coiler member, an electrically actuated governor means therefor, a control for said governor means comprising a testing means, relay solenoids operatively associated with said testing means, and timing means associated with said relay solenoids so that the actuation of the governor occurs during the pauses of the wire feed means.

26. In a structure of the class described, the combination of an intermittently acting wire feed means, a movable coiler member, means for actuating said coiler member, an electrically actuated governor means therefor, a control for said governor means comprising a testing means, and timing means whereby actuation of the governor occurs during the pauses of the wire feed means.

27. In a structure of the class described, the combination of wire feed means, a coiler block movable to vary the diameter of the coils, means for actuating said coiler block including an electrically actuated means for varying its throw controlled by the formed springs, a pitch block movable to vary the pitch of the coils, an independent electrically actuated means for adjusting said pitch block, and a length testing means operatively associated with said pitch block adjusting means.

28. In a structure of the class described, the combination of wire feed means, a coiler block movable to vary the diameter of the coils, means for actuating said coiler block for varying its throw controlled by the formed springs, a pitch block movable to vary the pitch of the coils, and a length testing means operatively associated with said pitch block adjusting means.

29. In a structure of the class described, the combination of a spring forming means including a pitch block movable to vary the pitch of the coils, means for adjusting said pitch block, and a length testing means operatively associated with said pitch block.

30. In a structure of the class described the combination with coiling means including a pitch block, means for adjusting said pitch block, and a length testing means operatively associated with said pitch block adjusting means.

31. In a structure of the class described, the combination with a coiling means including means for varying the length of the springs, a length testing means, and means actuated thereby for automatically controlling said coiling means.

32. In a structure of the class described, the combination with spring forming means including means for varying the length of the formed springs, and a length testing means for the formed springs operatively associated with said spring forming means whereby the spring forming means is controlled by the springs formed thereby.

33. In a structure of the class described, the combination with a coiling means including means for varying the diameter and means for varying the pitch of the coils, and independent means automatically controlled by the formed springs for controlling said diameter and pitch forming means.

34. In a structure of the class described, the combination of an intermittently acting wire feed means, a coiler member movable to vary the diameter of the coils, means for actuating said coiler member including an electrically actuated governor means for varying its throw, a reciprocating carriage, a testing finger guidably mounted on said carriage and adapted to coact with the formed springs as the carriage is advanced, a pair of contact members on said carriage, a coacting contact member actuated by said testing finger, and connections from said contact to said electrically actuated governor including relay solenoids and timing means.

35. In a structure of the class described, the combination of wire feed means, a coiler member movable to vary the diameter of the coils, means for actuating said coiler member including an electrically actuated governor means for varying its throw, a reciprocating carriage, a testing finger guidably mounted on said carriage and adapted to coact with the formed springs as the carriage is advanced, a pair of contact members on said carriage, a coacting contact member actuated by said testing finger, and connections from said contact to said electrically actuated governor including timing means.

36. In a structure of the class described, the combination of wire feed means, a coiler member movable to vary the diameter of the coils, means for actuating said coiler member including an electrically actuated governor means for varying its throw, a reciprocating carriage, a testing finger guidably mounted on said carriage and adapted to coact with the formed springs as the carriage is advanced, a pair of contact members on said carriage, a coacting contact member actuated by said testing finger, and connections from said contact to said electrically actuated governor.

37. In a structure of the class described, the combination of coil forming means including a member adjustable to vary the spring formed, a governor for automatically adjusting said member including a pair of actuating solenoids, a testing member for the formed spring, a pair of contact members, a coacting contact member actuated by said testing member, and connections from said pair of contact members to said governor actuating solenoids including relay solenoids and timing means.

38. In a structure of the class described, the combination of coil forming means including a member adjustable to vary the spring formed, a governor for automatically adjusting said member including a pair of actuating solenoids, a testing member for the formed spring, a pair of contact members, a coacting contact member actuated by said testing member, and connections from said pair of contact members to said governor actuating solenoids.

39. In a structure of the class described, the combination of coil forming means including a member adjustable to vary the spring formed, a governor for automatically adjusting said member including a pair of actuating solenoids, a testing member coacting with the formed spring, a pair of electrical contact members operatively associated with said solenoids, and a coacting contact member actuated by said testing member.

40. In a structure of the class described, the combination of coil forming means including a member adjustable to vary the spring formed, a governor for automatically adjusting said member, and control means comprising a testing member coacting with the formed spring, a pair of contact members, and a coacting contact member actuated by said testing member.

41. In a structure of the class described, the combination with a spring forming means including a member adjustable to vary the spring formed, a positioning and testing means comprising a rotating support, a swinging head adapted to fit within the upper end of a spring mounted on said support, a positioning stop yieldingly mounted on said head to engage the upper end of the spring to be positioned, a pair of contacts, a governing means for said spring forming member including a pair of actuating solenoids, connections from said contacts to said solenoids, and a coacting movable contact member actuated by the axial movement of said head.

42. In a structure of the class described, the combination with a spring forming means including a member adjustable to vary the spring formed, a positioning and testing means comprising a rotating support, a swinging head adapted to fit within the upper end of a spring mounted on said support, a positioning stop yieldingly mounted on said head to engage the upper end of the spring to be positioned, a pair of contacts, an electrically actuated governing means for said spring forming member, connections from said contacts to said governing means, and a coacting movable contact member actuated by said head.

43. In a structure of the class described, the combination with a spring forming means including a member adjustable to vary the spring formed, a testing means comprising a head adapted to engage the upper end of a spring, a pair of contacts, a governing means for said spring forming member including a pair of actuating solenoids, connections from said contacts to said solenoids, and a coacting movable contact member actuated by the axial movement of said head.

44. In a structure of the class described, the combination with a spring forming means including an adjustable member for varying the spring formed, a testing means comprising a head adapted to engage the end of the spring to be tested, a pair of contact members, a coacting contact member actuated by said head, and electrically actuated means for automatically controlling said adjustable spring forming member controlled by said contacts.

45. In a structure of the class described, the combination with a spring forming means including an adjustable member for varying the spring formed, a testing means comprising a head adapted to engage the end of the spring to be tested, and means for automatically controlling said adjustable spring forming member controlled by said head.

46. In a structure of the class described, the combination of a spring forming means, a positioning means comprising a rotatable support, a head adapted to engage the upper end of a spring mounted on said support, and a stop yieldingly mounted on said head to engage the end of said spring.

47. In a structure of the class described, the combination of an intermittently acting wire feed means, a coiler block movable to vary the diameter of the coils, means for actuating said coiler block for varying its throw controlled by the formed springs and acting during pauses in the feeding of the wire, a pitch block movable to vary the pitch of the coils, an independent electrically actuated means for adjusting said pitch block, and a length testing and positioning means operatively associated with said pitch block adjusting means.

48. In a structure of the class described, the combination of an intermittently acting wire feed means, a coiler block movable to vary the diameter of the coils, means for actuating said coiler block for varying its throw controlled by the formed springs and acting during pauses in the feeding of the wire, a pitch block movable to vary the pitch of the coils, means for adjusting said pitch block, and a length testing means operatively associated with said pitch block adjusting means.

In witness whereof, I have hereunto set my hand and seal.

BERT L. VAN ORMAN. [L. S.]